May 5, 1931.  S. K. DECKER ET AL  1,803,961
ACCOUNTING MEANS
Filed Sept. 19, 1927   4 Sheets-Sheet 1
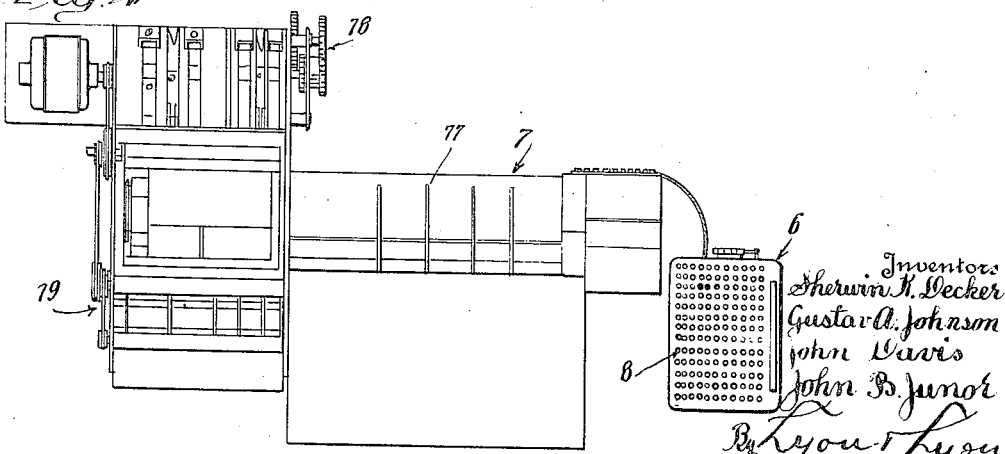

May 5, 1931.  S. K. DECKER ET AL  1,803,961
ACCOUNTING MEANS
Filed Sept. 19, 1927  4 Sheets-Sheet 2

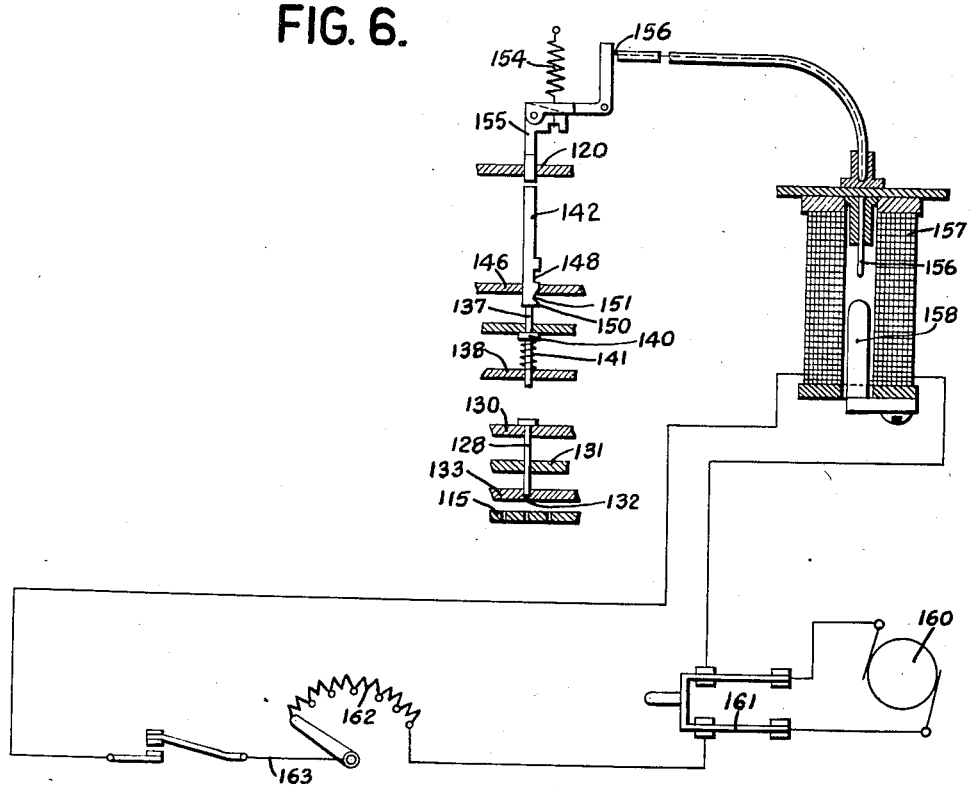

Patented May 5, 1931

1,803,961

UNITED STATES PATENT OFFICE

SHERWIN K. DECKER, GUSTAV ALFRED JOHNSON, JOHN W. DAVIS, AND JOHN BRUCE JUNOR, OF LOS ANGELES, CALIFORNIA, ASSIGNORS TO INTERNATIONAL BUSINESS MACHINES CORPORATION, OF NEW YORK, N. Y., A CORPORATION OF NEW YORK

ACCOUNTING MEANS

Application filed September 19, 1927. Serial No. 220,372.

This invention relates to accounting means, and is more particularly related to a mechanical accounting means by which a statement and ledger card are formed simultaneously by a single operator from or in a billing machine and a machine preferably of the typewriter punch type, and to the manner in which the said machines are connected together to permit their simultaneous operation by a single operator.

In the handling of a large quantity of small accounts such as are required to be handled by public utility corporations, the cost of billing and collecting the accounts due and of accounting is a major cost of the service rendered. In cases of public utilities, distributing water, gas, and electricity, and the like, the cost of the water, gas, or energy supplied is a small portion of the charge which the consumer must pay. The statements or charges will average a few dollars only, and the cost of postage in mailing these statements is a material consideration. It is essential that the statements be mailed at the lowest postal rate possible such, for example, as on postal cards so that a one cent rate may be had. As an example, in one city over 400,000 of such accounts are handled monthly which at the rate of one cent, and at the minimum, requires an expenditure of $4,000.00 in postage alone. The cost of getting out these statements or bills and keeping the accounts and collection controls and of tabulating and segregating these accounts is one of the most difficult problems encountered in the rendering of such service. Many different forms of card or stub accounting systems have been provided and suggested heretofore.

It is, therefore, an object of this invention to provide a means of keeping the accounts which includes the simultaneous formation of a statement including a receipt and cashier's stub, and a ledger card from which the amounts on the statement are tabulated, segregated and totalled by means of a tabulating machine or the like, the segregation and tabulation of the amounts being made possible by the use of codes formed in the ledger cards.

Another object of this invention is to provide a means of forming a statement and a ledger card simultaneously from a read book or the like so as to reduce or eliminate one possible source of error from the accounting systems.

Another object of this invention is to provide a means of connecting a billing machine of the full keyboard type with a typewriter punch machine so that a single operator may operate both machines simultaneously from the operating keyboard of the billing machine to form in a single operation a statement card or bill and a punched ledger card.

Other objects and advantages of this invention, it is believed, will be apparent from the following detailed description of a preferred embodiment thereof, as illustrated in the accompanying drawings.

In the drawings:

Figure 1 is a view of a statement card as formed in accordance with this invention.

Figure 2 is a view of a ledger card as formed in accordance with this invention.

Figure 4 is a plan view of a tabulating machine such as may be employed for tabulating and segregating the amounts as indicated by the ledger cards.

Fig. 6 is a diagrammatic illustration of the operation of the punch actuating solenoids.

The general plan of operation of the combination will first be briefly explained. A billing machine of the full key board type, that is, one which is provided with nine keys for each record column, is combined with an electrically operated typewriter card punch. Both of these machines are well known and are available on the market. Their construction and operation will therefore be explained only insofar as is necessary to an understanding of the combination. A tabulating card which after proper punching may be used as a ledger for mechanical accounting and auditing operations, is inserted in the punch and a card which is to be sent to a customer as a bill and will hereinafter be denoted as such is inserted in the billing machine.

The punching machine is provided with a punch for each index point position of the tabulating card and a carriage is arranged to travel over the punches and set them up for one card column after another, the setting up operation for each column automatically causing the carriage to escape to the next column. The punch setting mechanism may be electrically operated from a typewriter keyboard, each numeral key thereon being provided with electrical contacts which are closed by depression of the key to energize a corresponding electro-magnet and cause the setting up mechanism on the travelling carriage to select and set up the proper punches. After the carriage has completed the set up of the punches, operating mechanism is made effective to punch the entire card at a single stroke. The carriage is stepped in its punch setting up travel under control of escapement mechanism by means of a spring mounted in a drum and may be returned to home or starting position either at the end of a complete setting up operation or from any intermediate position. The carriage return mechanism consists of a member which is arranged to travel along a track parallel to the carriage movement and which may engage the carriage and return it to home position. This member is normally held at the extreme end of its track and is connected by a tape to a rotatable drum so that when the drum rotates the member will move along its track. This drum may be clutched to a constantly rotating shaft by an electrically operated clutch which is controlled from a key on the punch key board. Depression of this key at any time, of course, causes the carriage to return to its home or starting position in readiness to begin a new punching set up.

Figure 5:
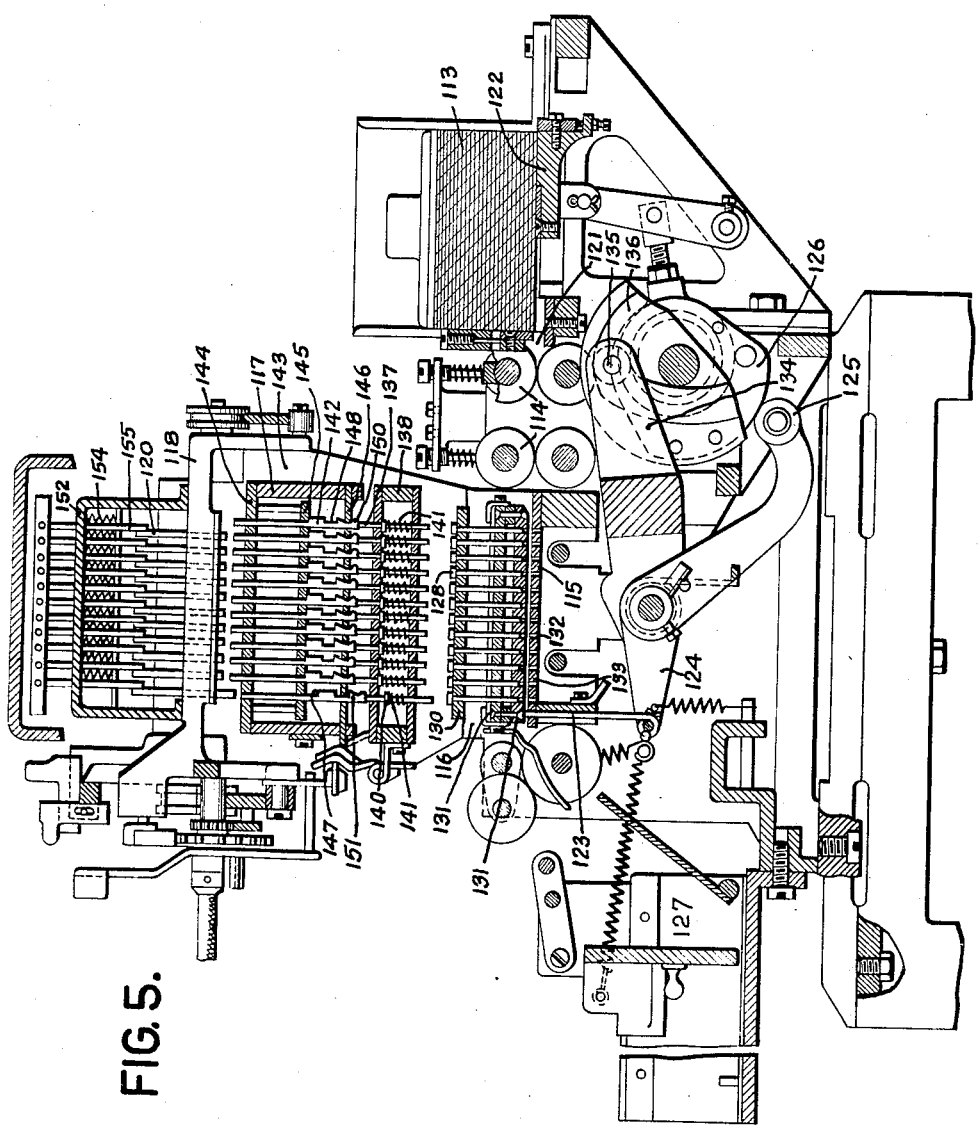
Fig. 5 is a sectional view of a punch used in connection with the invention.

The operation of the punching machine may be more clearly understood from Figs. 5 and 6 of the drawing. The card to be punched is inserted between die and stripper plates 132 and 131. Both of these plates are perforated to accommodate punches 128 which are supported through enlarged head portions by plate 130. A punch is provided for each index point position of the card, in other words there are ten punches for each card column. Each punch has an associated setting pin 137, normally held elevated by a coil spring 141, and directly above each setting pin is a setting bar 142. When any setting bar is depressed a cam portion on the same forces a spring actuated latch plate 146 to the right temporarily and permits it to snap into a notch 148 in the setting bar, thus holding the latter depressed. A depressed setting bar forces its cooperating setting pin 137 downwardly. Punching is effected by raising the die and stripper plates 132 and 131 with the card between them. The card raises any punch whose setting pin has not been lowered and locked but any punch whose setting pin is lowered cannot move upwardly and consequently perforates the card. After the perforating operation the latch plates 146 are moved to the right permitting the spiral springs surrounding the setting pins to raise the setting pins and setting bars to normal position.

The setting pins are set column by column, through rods 120 operated by bell cranks 156 (see Fig. 6). The bell cranks in turn are operated by Bowden wires 156 which are moved by core 158 of the solenoid 102 when the latter is energized. Only one set of rods 120 and bell cranks 155 is provided these being mounted on a movable carriage 152 which moves from one column to the next as soon as the punches are set up under control of suitable escapement mechanism. The carriage is moved in the set up direction by means of a tape wound on a spring actuated drum. It may be returned to starting position by clutching a winding drum for the tape to a constantly rotating shaft by an electromagnetically controlled clutch.

The billing machine is of the full key board type and according to the present invention is arranged so that all punching and printing operations may be controlled from its key board. The billing machine, through depression of its keys, sets up printing mechanism to print the entire data on the bill, the procedure being to set up all data on the key board and then cause simultaneous printing by depressing an operating button or lever. The billing machine keys for the purpose of the invention are provided with individual contacts which are closed when the keys are depressed and these contacts control the punch selecting mechanism of the punch. While the billing machine has ten keys for each column the punch has only ten for the complete set of punches and mechanism must be provided to transfer the connections between the billing machine and punch so that the set ups on the different columns of the billing machine keys are transferred to the punch columns successively.

The tabulating card which is inserted in the punch must contain classification perforations to identify the customer or other data relating to the bill. This information is in code, that is, it is represented by arbitrary numbers which would have no meaning to the recipient of the bill and consequently it is not printed. Certain columns or key banks of the billing machine are assigned to the setting up of this data. As the billing machine is not to print this data, however, its operating button cannot be depressed and other mechanism must be supplied to control the stepping of the set up carriage of the punch. This mechanism may preferably consist of a manually operated switch as will be explained later. After this classification data has been set up on the punch the error key of the billing machine is operated to release the depressed keys so that the coded data will not be printed in the subsequent operation of the machine. The data which is to be printed on the bill as well as punched on the tabulating card is now set up on the key board of the billing machine and the operating button of the latter is depressed to effect printing on the bill as well as the successive set up of the punch as has been briefly explained above and as will be more thoroughly explained hereinafter.

In the preferred embodiment of this invention, illustrated in the accompanying drawings, 1 illustrates a card which is preferably of the postal type and is perforated on a line 2 to permit the same to be divided into two sections, one of which provides a receipt 3 for the customer and the other of which provides a cashier's stub 4 which is returned to the creditor with the payment of the statement provided by the receipt 3 and stub 4. This card is identified as the bill.

A ledger card 5 is also employed in accordance with this invention and is of the type which is commonly employed in connection with electric or mechanically actuated tabulating and accounting machines or electric or other type key punches. This card is identified as the tabulating card.

Figure 3:
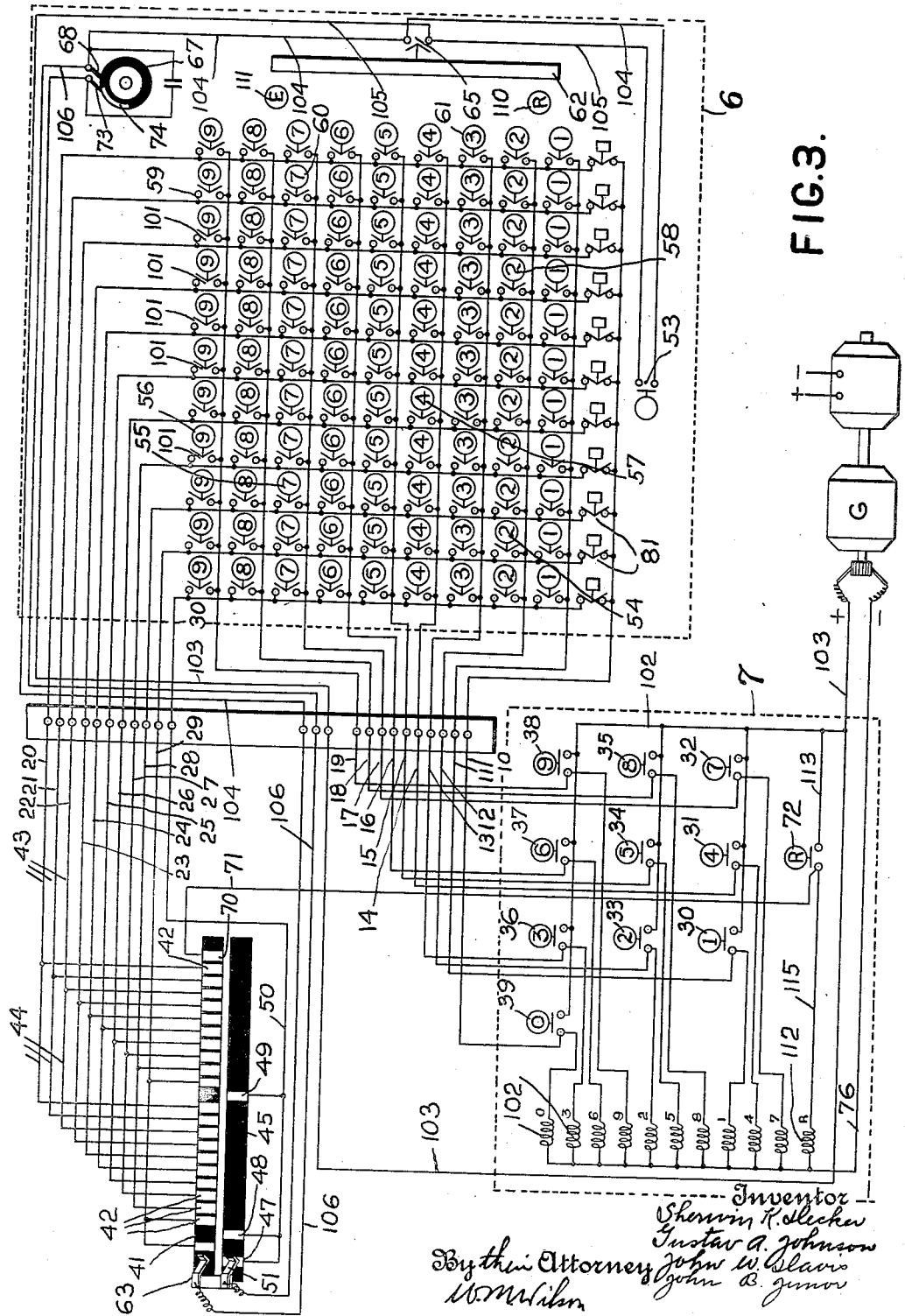
Figure 3 is a diagrammatic view of the connections formed between the billing machine and the typewriter punch machine as embodying this invention.

In accordance with this invention, the statement 1 and ledger card 5 are formed simultaneously by a single operator who operates a billing machine 6 and a punch 7. The billing machine 6 and punch 7 are connected together so as to permit the punch 7 to be operated from the keyboard 8 of the billing machine 6. In order to permit the formation of a complete statement and ledger card, it is essential that the billing machine 6 employed be of the type including a full keyboard, as indicated at 8 in Figure 3.

The punch 7 that we prefer to use is of the typewriter key punch type and operates from the ten key principle which allows but one key to be actuated at one time. This punch 7 includes a plurality of punch plungers which are spaced apart a distance equal to the spacing of the columns on the ledger sheet 5. The punches are actuated through solenoids connected with wires so that when a key is depressed an electric circuit to a solenoid is completed which moves the punch corresponding to the said key into position to punch the sheet 5. In this manner, the entire punch machine is set up with the punches desired moved to the punching position. The card 5 is then moved up toward the punches and the card is punched. The card 5 is then ejected from the machine and the punches return to the non-punching position.

The means provided for connecting the billing machine 6 with the punch 7 are preferably as follows:

Each key 54, 55, 56, etc. (see Fig. 3) of the billing machine is provided with a pair of normally open contacts 101 which are closed when the key is depressed. The billing machine has no zero keys while the punch has a zero key as it is customary to punch each column of a tabulating card regardless of whether the entry consists of a significant figure or zero. The billing machine takes care of zero printing by mechanism which is operated for each column by the significant figure keys in the adjacent column to the left; that is, if a key is depressed in one column and no key is depressed in the adjacent column to the right the zero type in this latter column will be automatically selected for printing. This is standard practice in printing machines of this class. Zero punching is provided for by a row of zero switches 81 which are normally closed and are opened by the depression of any numeral key in the corresponding vertical column. These zero switches may be controlled for each column by the same mechanism that selects the zero type for printing in the adjacent column to the right.

The electric punch keyboard is illustrated at 102 and contains a key for each of the ten digits, these keys being indicated by the numerals 30 to 39. In addition the keyboard is provided with a carriage return key 72 which, when depressed to bridge its contacts, effects engagement of the electrically operated clutch, previously referred to, to return the punch carriage to its starting position. Mounted adjacent the punch carriage are two insulating commutator bars 41 and 45 and the bars are provided with spaced contacts with which brushes 63 and 51 which may be mounted on the punch carriage, respectively, cooperate as the punch carriage feeds to its different positions. The contacts 47, 48 and 49 on bar 45 are connected in parallel through wire 50 to the vertical row of keys on the extreme left on the billing machine. The contacts 42 on the bar 41 are connected successively to the remaining ten vertical rows of keys to the right on the billing machine. It will be noted that no contact 42 is provided opposite the contacts 47, 48 and 49. The first, second and twelfth contacts 42 in the particular arrangement shown are connected to the second vertical row of keys on the billing machine; the third and thirteenth are connected to the third vertical row of keys on the billing machine and so on. The billing machine keys in horizontal rows are connected through wires 10 to 19 to the corresponding keys of the punch, that is, each nine key of the billing machine is connected to the nine key of the punch and so on. The last contact to the right on bar 41 designated 70 is connected to the carriage return key 72 of the punch. The reason for this particular arrangement of contacts will appear later.

The brush 63 coacting with commutator bar 41 is connected through wire 106 to a brush 68 of the commutator 67, which is constantly driven by the billing machine and the brush 51 coacting with commutator bar 45 is connected through wire 104 and switches 65 and 53 in parallel to this same brush 68. Another brush 73 coacting with commutator 67 is connected through source of energy G to a common contact 76 of the punch solenoids 102 and 112. As this commutator 67 rotates once each revolution the brushes 68 and 73 are bridged temporarily by the segment 74 of the commutator. The reason for this commutator may be explained at this point. The punch is operated by electric impulses which are normally initiated by striking the punch keys. In the present case the punch solenoids are to be operated from a set up on the billing machine and the set up remains until the punch has successively set up each column, in other words there is a persisting circuit instead of an intermittent one. The commutator 67 is provided to break this persisting circuit at proper intervals to make the punch operation exactly the same as it would be if the punch were operated in the normal manner by striking its keys successively for the different columns.

The mechanical and electrical operation of the machine will now be explained to assist in an understanding of how specific problems are handled by the machine. The brushes 63 and 51 travel with the punch carriage and one or the other comes into contact with a new contact 42 or 47, 48, 49 as the carriage steps to each new tabulating card column. It will be noted that the contacts 42 provide a circuit for the punch solenoids 102 as soon as the brush 63 comes into engagement with them. That is, as soon as the carriage steps from one column to the next this next column would be automatically set up and the punch carriage would continue its motion. But it is desired of course that the punch stop operation at intervals so that a new set up may be made on the billing machine keyboard and transferred to the punch. The punch columns which are connected to the extreme left hand row of keys of the billing machine are not provided with contacts 42 therefore but with contacts 47, 48 and 49 through which a punch set up circuit can only be completed through switches 53 or 65. In other words when brush 51 is on contact 47 the punch can only be set into operation by depressing manual push button switch 53 or by depressing the operating bar 62 of the billing machine which is arranged to close normally open switch 65. The first two columns to the left of the billing machine are arranged to have the code numbers set up on them which numbers are to be punched but not printed. Assume now that it is desired to transfer the set up on these two columns to the punch. The operating bar 62 is not depressed, because to do so would cause the data to be printed, but the manual switch 53 is depressed to supply starting energy from the punch. The circuit in this case for the first column extends from source of energy G through wire 103 to brushes 73 and 68, bridged by commutator segment 74, thence through 104 to push button switch 53 and through wire 105 to brush 51 which in the starting position of the punch is in engagement with contact 47 and thence through wire 50 to the billing machine keys in the first row to the left and through any depressed key contacts to the corresponding solenoid 102 of the punch. The energization of the punch solenoid 102 causes the punch corresponding to the depressed key in the left hand row of keys or the billing machine to be set up and this setting up causes the punch carriage to escape to the next column. Brush 63 now comes into engagement with the first contact 42 on bar 41 and a setting up circuit is completed independently of the switches 53 and 65. This circuit extends as follows: from source of energy G through wire 103, brushes 73 and 68 and wire 106 to brush 63, thence through first contact 42 and wire 29 to the second vertical row of billing machine key contacts and through a depressed key in this row and the corresponding wire 10 to 19 to the proper punch solenoid 102 and the source of energy G. The reading on the first two rows of billing machine keys is thus transferred to the punch by one operation of switch 53. The billing machine key board may now be cleared by depressing error key 111. After this second movement of the punch carriage, brush 63 rests on an insulating portion of the bar 41 while brush 51 rests on contact 48. The punch carriage can only continue its movement then by closing switch 53 or switch 65. Now a complete reading can be set up on the keyboard of the billing machine. This reading, it may be assumed is to be both printed and punched. Instead of closing the switch 53 then the operating bar 62 of the billing machine is depressed causing the billing machine to print the set up and incidentally closing switch 65. Thus switch completes a circuit for a solenoid of the punch exactly similar to that traced above for the first column of the billing machine causing a punch set up and the punch carriage escapes to the next column bringing brush 63 into engagement with another contact 42 whereupon a circuit similar to that traced above for the second row of keys of the billing machine is automatically established to set up the reading of the second row of billing machine keys on the punch. A contact 42 on bar 41 is provided for each of the remaining vertical rows of keys of the billing machine and the complete set up is thus transferred automatically to the punch. When the punch receives the set up of the last column of the billing machine, brush 63 again encounters an insulating space on bar 41 and the automatic stepping of the punch carriage ceases. At the same time brush 51 engages contact 49. A complete new set may now be effected on the billing machine and transferred to the punch. The operation of the punch must, of course, be initiated by closing switch 53 or depressing the operating bar 62 to close switch 65. Switch 53 will be used if it is desired to merely punch the set up while the operating bar will be used if it is desired to both punch and print it.

It may be stated that when the operating bar 62 is depressed to cause printing on the billing machine end selection of the punches, the punch action may be too sluggish for the billing machine as the billing machine prints the whole set up at a single stroke while the punch selection is a column to column affair. If there is a tendency for the punch to miss a portion of the set up for this reason the repeat key 110 of the billing machine may be locked down to hold the set up after printing and the set up may be released after the punch carriage ceases its movement by depressing the billing machine error key 111.

After the punch carriage reaches the last column brush 63 encounters contact 70 and a circuit is established for the carriage return magnet 112 of the punch. This circuit is as follows: from source of energy G through wire 103 to brushes 73 and 68 thence wire 106 to brush 63 and through contact 70 on bar 41 and wires 71 and 115 to carriage return magnet 112 and thence back to source G. The punch carriage is thereupon returned to its initial position in readiness to receive a new set up.

The operation of the machine in concurrently preparing the bill in Fig. 1 and the ledger card in Fig. 2 will now be explained. It will be assumed that the code is to be punched in columns 17 and 18 of the tabulating card. The code as indicated consists of 2 in column 17 and 0 in column 18. These figures are set up on the two columns to the left of the billing machine and switch 53 is depressed causing the punch to take these two readings for columns 17 and 18. The error key is then depressed to clear the billing machine.

The present and previous readings, as indicated from the "read book" from which the statement and ledger card are being formed are then set up in the keyboard of the billing machine 6, which likewise sets up the same readings in the punch machine 7. The readings that are indicated on the statement 1 of the ledger card 5 are set up on the keyboard of the billing machine 8 by punching the keys beginning with the second column to the left to read "2" by punching the key 54, the numeral "7" by punching the key 55, the numeral "9" by punching the key 56, and the numeral "4" by punching the key 57. The next vertical set of keys is preferably protected by a guard to prevent the same being used and so as to divide the keyboard 8 of the billing machine 6. Such a guard is customarily provided in billing machines of this type so that its particular construction and use is believed well understood in the art. The previous reading is then set up on the keyboard in the following manner by punching the keys 58, 59, 60, and 61 in the order named. The operating bar 62 is then actuated which closes switch 65 to initiate punch carriage operation and the electrical connection between the keys as depressed and the corresponding punches of the punch machine 7 as the trolley 63 traverses the contacts on the contact bar 41, selects these punches in the punch machine 7 in position to punch the ledger card 5.

The second set of items, that is, the consumption and amount is then set up on the keyboard of the billing machine 6 in a manner similar to that in which the present and previous readings are set up therein and the switch 65 is actuated to complete the electrical circuits so that the trolleys 51 and 63 traverse the contact bars 41 and 45, the trolley 63 passing to the end of the contact bar 42 engages the return contact 70 which is connected by means of the wire 71 with the return key 72 of the punch machine 7 so that the punches previously set up in the punch machine 7 are returned to the non-operating position and the trolleys 51 and 63 travel back to the starting position. The mechanism of the punch machine 7 which returns the trolleys 51 and 62 to the starting position includes a carriage which releases latches holding the punch plungers of the punch machine in the position to punch the card 5.

In the punch machine 7, such things as the book number and whether or not the same are debit or credit cards, are constant insignia which may be set up in the punch machine before variable readings are set up so that these constant readings will appear upon each and all of the ledger cards of any particular set.

Having fully described our invention, it is to be understood that we do not wish to be limited to the details herein set forth but our invention is of the full scope of the appended claims.

We claim:

1. In combination a key operated billing machine, a punch including a plurality of series of punches with means for selecting the punches of the several series successively and connections intermediate the billing machine and punch to effect operation of the punch selecting means for the several punch series form the keyboard of the billing machine.

2. In combination a key operated billing machine of the full keyboard type, a punch including a plurality of series of punches with means for selecting the punches of the several series successively and connections intermediate the billing machine and punch to effect operation of the selective means of the latter from the several columns of keys of the billing machine successively.

3. In combination a billing machine provided with settable keys and operating mechanism for operating the machine according to key settings, a punch including punching mechanism for punching in a plurality of columns, connections intermediate the billing machine and the punch for controlling punch selection from the billing machine keys and means for selectively initiating operation of the punch on operation of the billing machine operating mechanism or independently thereof.

4. In combination a billing machine provided with a plurality of columns of keys, a punch with mechanism for punching in a plurality of columns and means for selecting the punching in the several columns successively, means controlled by the billing machine keys for determining the selection of punching in the several columns and means for shifting the control of the punching selecting means successively to the several columns of billing machine keys.

5. In combination a billing machine provided with a plurality of columns of settable keys and operating mechanism for operating the machine according to key settings, a punch with mechanism for punching in a plurality of columns and means for selecting the punching in the several columns successively, means controlled by the billing machine keys for determining the selection of punching in the several columns, means for shifting the control of the punching selecting means successively to the several columns of the billing machine keys and mechanism controlled by the operating mechanism of the billing machine for initiating the operation of the shifting means.

6. In combination a billing machine provided with a plurality of columns of settable keys and operating mechanism for operating the machine according to key settings, a punch with mechanism for punching in a plurality of columns and means for selecting the punching in the several columns successively, means controlled by the billing machine keys for determining the selection of punching in the several columns, means for shifting the control of the punching selecting means successively to the several columns of the billing machine keys and selective means for initiating operation of the shifting means either on operation of the operating means of the billing machine or independently thereof.

7. In combination a billing machine with a plurality of columns of settable keys, a punch with mechanism for punching in a plurality of columns, means controlled by the billing machine keys for determining the selection of the punching in the several columns, means for initiating operation of the determining means and means for interrupting the operation of the same prior to punching selection for all the columns.

8. In combination a billing machine with a plurality of columns of settable keys, a punch with mechanism for punching in a plurality of columns, means controlled by the billing machine keys for determining the selection of punching in the several columns, means for initiating operation of the determining means and means for interrupting operation of the same after punching selection for a predetermined number of columns.

9. In combination a billing machine with a plurality of columns of settable keys, a punch with selective mechanism for selecting punching in a plurality of columns successively, means controlled by the billing machine keys for determining the operation of the punching selective mechanism according to the key settings, shifting means for shifting the control of the selective mechanism to the several columns of billing machine keys successively and means for interrupting the operation of the shifting means after control of a predetermined number of columns.

Signed at Los Angeles, California, this 8th day of September 1927.

SHERWIN K. DECKER.
GUSTAV ALFRED JOHNSON.
JOHN W. DAVIS.
JOHN BRUCE JUNOR.